(12) United States Patent
Wegner et al.

(10) Patent No.: US 7,579,048 B2
(45) Date of Patent: Aug. 25, 2009

(54) METHOD FOR IMPROVING THE ADHESION OF THE INTERMEDIATE LAYER IN A MULTI-PAINT FINISH

(75) Inventors: Egon Wegner, Greven (DE); Stephan Schwarte, Emsdetten (DE)

(73) Assignee: BASF Coatings, Munster (DE)

( * ) Notice: Subject to any disclaimer, the term of this patent is extended or adjusted under 35 U.S.C. 154(b) by 590 days.

(21) Appl. No.: 10/549,055

(22) PCT Filed: Mar. 3, 2004

(86) PCT No.: PCT/EP2004/002100

§ 371 (c)(1),
(2), (4) Date: Sep. 13, 2005

(87) PCT Pub. No.: WO2004/082853

PCT Pub. Date: Sep. 30, 2004

(65) Prior Publication Data

US 2006/0193989 A1 Aug. 31, 2006

(30) Foreign Application Priority Data

Mar. 15, 2003 (DE) .................................. 103 11 476

(51) Int. Cl.
*B05D 1/36* (2006.01)
(52) U.S. Cl. .................... 427/402; 427/407.1; 524/839; 524/840; 525/124; 525/330.5
(58) Field of Classification Search .................. 524/839, 524/840; 525/124, 330.5; 427/402, 407.1
See application file for complete search history.

(56) References Cited

U.S. PATENT DOCUMENTS

| | | | |
|---|---|---|---|
| 6,099,899 A | 8/2000 | Briggs et al. | |
| 6,221,949 B1 | 4/2001 | Gross et al. | |
| 6,583,214 B1 * | 6/2003 | Haeberle et al. | ............. 524/589 |
| 6,602,972 B1 * | 8/2003 | Schwarte et al. | ............. 528/45 |
| 6,632,915 B1 | 10/2003 | Schwarte et al. | |
| 6,943,210 B2 | 9/2005 | Rockrath et al. | |
| 2003/0100667 A1 | 5/2003 | Bendix et al. | ............... 524/558 |
| 2003/0153662 A1 | 8/2003 | Lassman et al. | ............. 524/377 |
| 2004/0102595 A1 | 5/2004 | Schwarte et al. | ............. 528/44 |
| 2004/0132902 A1 | 7/2004 | Bremser et al. | |

FOREIGN PATENT DOCUMENTS

| | | |
|---|---|---|
| DE | 19953445 | 5/2001 |
| DE | 19948004 A1 | 7/2001 |
| DE | 10006673 | 9/2001 |
| DE | 10001442 A1 | 10/2001 |
| DE | 10027290 | 12/2001 |
| DE | 10039262 | 2/2002 |
| DE | 10126651 A1 | 12/2002 |
| EP | 0788523 B1 | 10/1995 |

* cited by examiner

*Primary Examiner*—Bernard Lipman
(74) *Attorney, Agent, or Firm*—Cantor Colburn LLP

(57) ABSTRACT

A process for improving the intercoat adhesion in a multicoat paint system utilizing a primer coat, an aqueous basecoat, and a clearcoat, where the multicoat paint system has been produced by means of a wet-on-wet technique. The clearcoat is produced using a pseudoplastic powder clearcoat slurry prepared by a secondary dispersion process or a melt emulsification process. The aqueous basecoat material used to produce the aqueous basecoat comprises a dispersed graft copolymer whose particles are composed of a hydrophobic core of copolymerized olefinically unsaturated monomers and of a hydrophilic shell which comprises a polyurethane, where said copolymer is prepared by free-radical (co)polymerization of the monomers in the presence of at least one polyurethane containing specially selected olefinically unsaturated groups.

14 Claims, No Drawings

METHOD FOR IMPROVING THE ADHESION OF THE INTERMEDIATE LAYER IN A MULTI-PAINT FINISH

RELATED APPLICATIONS

This application is a National Phase application of PCT/EP2004/002100 filed on 3 Mar. 2004, which claims priority to DE 103 11 476.9, filed 15 Mar. 2003.

BACKGROUND OF THE INVENTION

The invention relates to a method of enhancing the intercoat adhesion in a multicoat paint system.

A process for producing multicoat paint systems, wherein
1) the substrate is coated with a primer, in particular an electrocoat material,
2) the primer film applied in stage 1, in particular an electrocoat film, is optionally predried and cured,
3) the cured primer coat, in particular electrocoat, is coated with a first aqueous coating material,
4) the coating film applied in stage 3 is optionally predried and, without a curing step, is coated with a second aqueous coating material,
5) the coating film applied in stage 4) is coated with a transparent coating material, and
6) the films are cured together, is known, for example, from European patent EP 0 788 523 B 2. This process is referred to below for the sake of brevity as an "integrated wet-on-wet process". It results in a multicoat paint system made up of
primer, especially electrocoat 1,
aqueous basecoat or functional or surfacer coat 2,
aqueous basecoat 3, and
clearcoat 4.

With this process it is possible to obtain multicoat paint systems having particularly low coat thicknesses without quality detractions particularly in connection with the stonechip resistance. Critical to the process is that the aqueous coating material or aqueous basecoat material 1 applied in stage 3) comprises a binder composed of a water-dilutable polyurethane resin which has an acid number of from 10 to 60 and a number-average molecular weight of from 4000 to 25000 and is preparable by reacting with one another
a polyester- and/or polyetherpolyol having a number-average molecular weight of from 400 to 5000 or a mixture of such polyester- and polyetherpolyols,
a polyisocyanate or a mixture of polyisocyanates,
a compound containing per molecule at least one isocyanate-reactive group and at least one group capable of forming anions, or a mixture of such compounds, and, if desired,
a hydroxyl- and/or amino-containing organic compound having a molecular weight of from 40 to 400 or a mixture of such compounds and at least partly neutralizing the resultant reaction product.

German patent applications DE 198 41 842 A 1, DE 100 01 442 A 1, and DE 100 55 464 A 1 disclose pseudoplastic powder clearcoat slurries free from organic solvents and external emulsifiers and preparable by
1) emulsifying an organic solution comprising binder and crosslinker to give an emulsion of the oil-in-water type,
2) removing the organic solvent or solvents, and
3) replacing some or all of the solvent volume removed with water to give the powder clearcoat slurry containing solid spherical particles.

This process is referred to below as the "secondary dispersion process".

Furthermore, German patent application DE 101 26 651 A 1 and German patent 100 06 673 C 1 disclose powder clearcoat slurries preparable by
1) emulsifying at least one constituent of the powder clearcoat slurry in the liquid state, in particular in the melt state, in an aqueous medium to form an aqueous emulsion of liquid particles and
2) cooling the emulsion so that an aqueous suspension of dimensionally stable particles is formed.

This process is referred to below as the "melt emulsification process".

Additionally, the powder clearcoat slurries produced by means of the secondary dispersion process or the melt emulsification process are referred to below as "second generation powder clearcoat slurries".

If these known second generation powder clearcoat slurries prepared by the secondary dispersion process or melt emulsification process are employed instead of the two-component clearcoat material in stage 5) of the integrated wet-on-wet process known from European patent EP 0 788 523 B 2 they result in multicoat paint systems which have very good optical properties, very good leveling, very good intercoat adhesion, high chemical resistance, and weathering stability. Moreover, the multicoat paint systems are free from pops and from cracks (mud cracking). Within the art it has been found, however, that the adhesion between the aqueous basecoat 2 and the clearcoat is lost following condensation exposure and/or stonechip exposure, with the consequence of clearcoat delamination on subsequent exposure to steam jets and/or hot water jets.

This problem does not occur to the same extent with the multicoat paint systems known from German patent applications DE 199 48 004 A 1 and DE 100 39 262 A, produced by means of the integrated wet-on-wet technique. The clearcoats of these multicoat paint systems are produced, however, from powder clearcoat slurries produced by extrusion of the constituents, comminution of the resulting cooled melt, dry grinding of the resulting chips, and wet grinding, as is known, for example, from European patent application EP 0 652 264 A 1, international patent application WO 96/32452 A 1, American patent U.S. Pat. No. 4,268,542 A 1 or German patent applications DE 195 18 392 A 1, DE 196 13 547 A 1, and DE 198 14 471 A 1. The powder clearcoat slurries produced by this process are referred to below as "first generation powder clearcoat slurries".

This process for producing first generation powder clearcoat slurries is, however, considerably more complicated than the secondary dispersion process or the melt emulsification process. Moreover, the mechanical load on second generation powder clearcoat slurries during their preparation is lower than on the first generation powder clearcoat slurries. In addition, the physical composition of the second generation powder clearcoat slurries can be varied very much more widely than that of the first generation powder clearcoat slurries.

Accordingly, the use of the second generation powder clearcoat slurries in the integrated wet-on-wet process would be preferred over the use of the first generation powder clearcoat slurries if only it were possible to eliminate the problems of intercoat adhesion following exposure to condensation and/or stone chipping in the multicoat paint systems in question.

German patent DE 100 27 290 C 2 and German patent application DE 100 27 292 A 1 disclose multicoat paint systems which can be produced by the integrated wet-on-wet process. It is also possible here to use second generation powder clearcoat slurries, among others.

The aqueous coating materials used in stage 3) can be selected from a large number of aqueous surfacers or aqueous basecoat materials. Thus all of the aqueous surfacers described in documents EP 0 401 565 A 1 or EP 0 817 684 A 1, U.S. Pat. No. 4,537,926 A 1, EP 0 529 335 A 1, EP 0 595 186 A 1, EP 0 639 660 A 1, DE 44 38 504 A 1, DE 43 37 961 A 1, WO 89/10387, U.S. Pat. No. 4,450,200 A 1, U.S. Pat. No. 4,614,683 A 1 or WO 94/26827 and all of the aqueous basecoat materials described in documents EP 0 089 497 A 1, EP 0 256 540 A 1, EP 0 260 447 A 1, EP 0 297 576 A 1, WO 96/12747, EP 0 523 610 A 1, EP 0228 003 A 1, EP 0 397 806 A 1, EP 0 574 417 A 1, EP 0 531 510 A 1, EP 0 581 211 A 1, EP 0 708 788 A 1, EP 0 593 454 A 1, DE 43 28 092 A 1, EP 0 299 148 A 1, EP 0 394 737 A 1, EP 0 590 484 A 1, EP 0 234 362 A 1, EP 0 234 361 A 1, EP 0 543 817 A1, WO 95/14721, EP 0 521 928 A1, EP 0 522 420 A1, EP 0 522 419 A 1, EP 0 649 865 A 1, EP 0 536 712 A 1, EP 0 596 460 A 1, EP 0 596 461 A 1, EP 0 584 818 A 1, EP 0 669 356 A 1, EP 0 634 431 A 1, EP 0 678 536 A 1, EP 0 354 261 A 1, EP 0 424 705 A 1, WO 97/49745, WO 97/49747, and EP 817 684 A 1 are said to be suitable.

Some of these aqueous basecoat materials comprise dispersed graft copolymers whose particles are composed of
  a hydrophobic core of at least one copolymerized olefinically unsaturated monomer and
  a hydrophilic shell which comprises or consists of at least one polyurethane and are prepared by free-radical polymerization of the monomers in the presence of a polyurethane having terminal and/or lateral allyl and/or (meth)acrylate groups. No differentiation is made between these graft copolymers and other polyurethanes which are not graft copolymers in terms of the performance properties of the paint systems produced therewith.

The examples of German patent DE 100 27 290 C 2 and of German patent application DE 100 27 292 A 1, however, merely reveal multicoat paint systems produced by the integrated process of European patent EP 0 788 523 B 2 using first generation powder clearcoat slurries, and accordingly these documents offer no suggestions or indications toward solving the described problems of the intercoat adhesion.

SUMMARY ON THE INVENTION

It is an object of the present invention, therefore, to provide a novel process for improving the intercoat adhesion in a multicoat paint system produced by means of an integrated wet-on-wet process by
(I) applying at least one primer material 1 to the surface of the substrate and drying the resulting primer film(s) 1, especially electrocoat film(s) 1, or curing the primer film(s) 1 to give at least one primer coat 1,
(II) applying at least one aqueous basecoat material 2 to the outer surface of the primer film(s) 1 or of the primer coat(s) 1 and if desired drying the resulting aqueous basecoat film(s) 2 without fully curing it (them),
(III) applying at least one aqueous basecoat material 3 to the outer surface of the dried aqueous basecoat film(s) 2 and if desired drying the resulting aqueous basecoat film(s) 3 without fully curing it (them),
(IV) applying at least one pseudoplastic second generation powder clearcoat slurry 4 to the outer surface of the dried aqueous basecoat film(s) 3 and if desired drying the resulting clearcoat film(s) 4, and
(V) jointly curing the dried clearcoat film(s) 4, the dried aqueous basecoat film(s) 2, and the dried aqueous basecoat film(s) 2 and also where appropriate the dried primer film(s) 1 to give the multicoat paint system composed of
  (1) at least one primer coat 1,
  (2) at least one aqueous basecoat or functional coat or surfacer coat 2,
  (3) at least one aqueous basecoat 3, and
  (4) at least one clearcoat 4, which significantly improves in particular the adhesion between the aqueous basecoat(s) 3 and the clearcoat(s) 4 so that following exposure to condensation and/or stone chipping and subsequent exposure to steam jets and/or hot water jets there is no longer any clearcoat delamination.

At the same time there should be no adverse effect on the known advantageous properties of the multicoat paint systems, particularly their so-called automotive quality (cf. European patent EP 0 352 298 B1, page 15 line 42 to page 17 line 40).

DETAILED DESCRIPTION

The present invention accordingly provides the novel process for improving the intercoat adhesion in a multicoat paint system produced by means of an integrated wet-on-wet process by
(I) applying at least one primer material to the surface of the substrate and if desired drying the resulting primer film(s) 1, without fully curing it (them), or curing the primer film(s) 1 to give at least one primer coat 1,
(II) applying at least one aqueous basecoat material 2 to the outer surface of the primer film(s) 1 or primer coat(s) 1 and if desired drying the resulting aqueous basecoat film(s) 2 without fully curing it (them),
(III) applying at least one aqueous basecoat material 3 to the outer surface of the dried aqueous basecoat film(s) 2 and if desired drying the resulting aqueous basecoat film(s) 3 without fully curing it (them),
(IV) applying at least one pseudoplastic powder clearcoat slurry 4 preparable by means of
  (α) a secondary dispersion process by emulsifying an organic solution comprising binder and crosslinker to give an emulsion of the oil-in-water type, removing the organic solvent or solvents, replacing some or all of the solvent volume removed with water, to give the powder clearcoat slurry comprising spherical dimensionally stable particles, or by means of
  (β) a melt emulsification process in which at least one constituent of the powder clearcoat slurry is emulsified in the liquid state, in particular in the melt state, in an aqueous medium to form an aqueous emulsion of liquid particles and the emulsion is cooled to form an aqueous suspension of dimensionally stable particles,
  to the outer surface of the dried aqueous basecoat film(s) 3 and if desired drying the resulting clearcoat film(s) 4, and
(V) jointly curing the dried clearcoat film(s) 4, the dried aqueous basecoat film(s) 3, and the dried aqueous basecoat film(s) 2 and also where appropriate the primer film(s) 1 to give the multicoat paint system composed of at least one primer coat 1, at least one aqueous basecoat or functional coat or surfacer coat 2, at least one aqueous basecoat 3, and at least one clearcoat 4;

wherein the aqueous basecoat material(s) 2 employed in stage (II) comprise(s) as binder at least one dispersed graft copolymer (A/B) whose particles are composed of a hydrophobic core (A) of at least one copolymerized olefinically unsaturated monomer (a) and a hydrophilic shell (B) which comprises or consists of at least one hydrophilic polyurethane (b) and is (are) prepared by subjecting the monomers (a) to free-radical (co)polymerization in the presence of at least one hydrophilic polyurethane (b 1) containing at least one olefinically unsaturated group selected from the group consisting of lateral and terminal ethenylarylene groups;
lateral olefinically unsaturated groups attached to cycloaliphatic groups which constitute members of the main polymer chains;
lateral cycloolefinically unsaturated groups which constitute members of the main polymer chains;
terminal olefinically unsaturated groups attached to cycloaliphatic groups which constitute the end groups of the main polymer chains;
terminal cycloolefinically unsaturated groups which constitute the end groups of the main polymer chains; and
lateral and terminal olefinically unsaturated groups obtained by reacting polyurethanes with anhydrides of alpha,beta-unsaturated carboxylic acids.

The novel process for improving the intercoat adhesion in a multicoat paint system produced by means of an integrated wet-on-wet process is referred to below as "process of the invention".

For the skilled worker it was surprising and unforeseeable that by using the graft copolymer (A/B) as binder in the aqueous basecoat material 2 used in stage (III) to produce the aqueous basecoat 2 it was possible to improve the adhesion between the overlying aqueous basecoat 3 and the clearcoat 4. In particular it was possible to improve the intercoat adhesion to such an extent that even after exposure to stone chipping and/or condensation there was no longer any clearcoat delamination on subsequent exposure of the multicoat paint system to steam jets and/or hot water jets.

Particularly surprising was the fact that, using the graft copolymer (A/B) in the aqueous basecoat material 2, it was possible at the same time to obtain an improvement in the popping limit in the aqueous basecoat 3 and the clearcoat 4.

Overall it was surprising that the multicoat paint systems produced by means of the process of the invention possess the full extent of the automotive quality required by the automakers.

The process of the invention starts from a substrate.

Suitable substrates include all surfaces to be coated which are not damaged by curing of the coatings present thereon using heat; they include, for example, the inventive moldings, films, and fibers, metals, plastics, wood, ceramic, stone, textile, fiber composites, leather, glass, glass fibers, glass wool, rock wool, mineral-bound and resin-bound building materials, such as plasterboard and cement slabs or roofing shingles, and also composites of these materials. The process of the invention is suitable accordingly for the coating of means of transport, such as water vehicles, rail vehicles, aircraft, vehicles operated with muscle power, and motor vehicles, especially automobiles, of furniture, doors, windows, and the inside and outside of buildings, and also for industrial coating, including coil coating, container coating, and the impregnation or coating of electrical components. In the context of the industrial coatings the process of the invention is suitable for the coating of virtually all parts for private or industrial use, such as radiators, household appliances, small metal parts such as nuts and bolts, hub caps, wheel rims, packaging or electrical components such as motor windings or transformer windings. The process of the invention is employed in particular for the finishing of automobile bodies.

Suitable substrates also include primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations to DIN 7728T1). The plastics to be coated can of course also be polymer blends, modified plastics or fiber-reinforced plastics. It is also possible to employ the plastics commonly used in vehicle construction, especially automotive engineering.

Nonfunctionalized and/or apolar substrate surfaces can be subjected prior to coating in a known way to a pretreatment, such as with a plasma or by flaming, or can be provided with a hydroprimer coat 1.

In the case of electrically conductive substrates it is possible to use primer coats 1 produced conventionally from electrocoat materials. Suitable for this purpose are both anodic and cathodic electrocoat materials, but especially cathodic.

Examples of suitable cathodic electrocoat materials 1 are described in Japanese patent application 1975-142501 (Japanese laid-open specification JP 52-065534 A 2, Chemical Abstracts Reference No. 87: 137427) or in patents U.S. Pat. No. 4,375,498 A 1, U.S. Pat. Nos. 4,537,926 A 1, 4,761,212 A 1, EP 0 529 335 A 1, DE 41 25 459 A 1, EP 0 595 186 A 1, EP 0 074 634 A 1, EP 0 565 445 A 1, DE 42 35 778 A 1, EP 0 646 420 A 1, EP 0 639 660 A 1, EP 0 817 648 A 1, DE 195 12 017 C 1, EP 0 192 113 A 2, DE 41 26 476 A 1 or WO 98/07794.

It is preferred to use electrocoats, especially cathodic electrocoats, as primer coats 1.

In the process of the invention in step (I) at least one, especially one, primer 1, preferably an electrocoat 1, in particular a cathodic electrocoat 1, is applied to the surface of the substrate. The electrocoat 1, in particular the cathodic electrocoat 1, is applied conventionally by anodic or cathodic, especially cathodic, electrodeposition coating.

Thereafter the resulting primer film(s) 1, in particular the electrocoat film(s) 1, can be dried, without being fully cured.

Drying may take place during a certain rest time. This may have a duration of from 30 s to 2 h, preferably from 1 min to 1 h, and in particular from 1 min to 45 min. The rest time serves for the leveling and devolatilization of the primer film(s) 1and for the evaporation of volatile constituents such as water and solvents. The rest time can be shortened and/or assisted by employing elevated temperatures of up to 90° C. and/or by a reduced air humidity <10 g water/kg air, in particular <8 g water/kg air, provided this does not entail any damage or change to the primer film(s) 1, such as premature complete crosslinking.

The coating materials applied in the further course of the process of the invention (aqueous basecoat material 2, aqueous basecoat material 3, and powder clearcoat slurry 4) can be dried in the same way.

The primer film(s) 1 can also be cured fully to give at least one, especially one, primer coat 1, preferably an electrocoat 1.

The thermal cure has no special features as far as its method is concerned but instead takes place by the conventional methods such as heating in a forced-air oven or irradiation with near infrared (NIR) or infrared (IR). The thermal cure here may also take place in stages. Advantageously the thermal cure takes place at a temperature of from 50 to 100° C., more preferably from 80 to 100° C., and in particular from 90 to 100° C. for a time of from 1 min up to 2 h, more preferably from 2 min up to 1 h, and in particular from 3 min to 30 min, if the thermal load-bearing capacity of the substrates is not great. Where substrates are used which do have high thermal load-bearing capacities the thermal crosslinking may even be conducted at temperatures above 100° C. Generally speaking it is advisable in that case not to exceed temperatures of 180° C., preferably 160° C., and in particular 155° C.

In step (II) of the process of the invention at least one, especially one, aqueous basecoat material 2 is applied to the outer surface of the primer film(s) 1, in particular the electrocoat film(s) 1, or to the outer surface of the primer coat(s) 1, in particular the electrocoat(s) 1.

The aqueous basecoat materials 2 can be applied by any standard method, such as spraying, knife coating, brushing, flow coating, dipping, impregnating, trickling or rolling, for example. The substrate to be coated may in this case be itself at rest, with the application equipment or unit being moved. Alternatively the substrate to be coated, in particular a coil, may be moved, with the application unit being at rest relative to the substrate or being moved appropriately.

It is preferred to employ spray application methods, such as compressed air spraying, airless spraying, high-speed rotation, electrostatic spray application (ESTA), alone or in conjunction with hot spray application such as hot air spraying, for example. The applications can be made at temperatures of max. 70 to 80° C., so that suitable application viscosities are achieved without the brief thermal load being accompanied by any change or damage to the aqueous basecoat material or its overspray (which may be intended for reprocessing). Hot spraying, for instance, can be configured in such a way that the aqueous basecoat material 2is heated only very briefly in the spray nozzle or only a short way upstream of the spray nozzle.

The spray booth which is used for the application may be operated, for example, with a circulation system, possibly a temperature-controlable circulation system, which is itself operated with a suitable absorption medium for the overspray, an example of such a medium being the aqueous basecoat material 2 itself.

It is a particular advantage of the process of the invention that these application techniques can also be employed with advantage for the application of the further coating materials (aqueous basecoat material 2 and powder clearcoat slurry 4).

Thereafter the resulting aqueous basecoat film(s) 2 can be dried, without full curing thereof.

For the process of the invention it is essential that the aqueous basecoat material 2comprises as binder at least one, especially one, dispersed graft polymer (A/B) whose particles are composed of a hydrophobic core (A) of at least one copolymerized olefinically unsaturated monomer (a) and a hydrophobic shell (B) which comprises or consists of at least one hydrophilic polyurethane (b) and are prepared by the free-radical (co)polymerization of the monomers (a) in the presence of at least one hydrophilic polyurethane (b 1).

For the hydrophilic polyurethane (b 1) it is essential that it contains at least one olefinically unsaturated group selected from the group consisting of lateral and terminal ethenylarylene groups;

lateral olefinically unsaturated groups attached to cycloaliphatic groups which constitute members of the main polymer chains;

lateral cycloolefinically unsaturated groups which constitute members of the main polymer chains;

terminal olefinically unsaturated groups attached to cycloaliphatic groups which constitute the end groups of the main polymer chains;

terminal cycloolefinically unsaturated groups which constitute the end groups of the main polymer chains; and lateral and terminal olefinically unsaturated groups obtained by reacting polyurethanes with anhydrides of alpha,beta-unsaturated carboxylic acids.

For the purposes of the present invention the property of being hydrophilic refers to the constitutional property of a molecule or functional group to penetrate the aqueous phase or to remain therein. Accordingly, for the purposes of the present invention, the property of being hydrophobic refers to the constitutional property of a molecule or functional group to behave exophilically with respect to water, i.e., they display the tendency not to penetrate water or else to depart the aqueous phase. For further details refer to Römpp Lexikon Lacke und Druckfarben, Georg Thieme Verlag, Stuttgart, New York, 1998, "Hydrophilicity", "Hydrophobicity", pages 294 and 295.

It is preferred to use ethenylarylene groups of the general formula I:

$$CH_2=C(R)-A- \qquad (I),$$

in which the variable A stands for a substituted or unsubstituted $C_6$-$C_{20}$ arylene radical and the variable R stands for a hydrogen atom, a halogen atom, a nitrile group or an unsubstituted or substituted alkyl, cycloalkyl, alkylcycloalkyl, cycloalkylalkyl, aryl, alkylaryl, cycloalkylaryl, arylalkyl or arylcycloalkyl radical.

Examples of suitable alkyl radicals R are methyl, ethyl, propyl, isopropyl, n-butyl, isobutyl, tert-butyl, amyl, hexyl, heptyl, octyl, 2-ethylhexyl, isooctyl, nonyl, decyl, undecyl, dodecyl, tridecyl, tetradecyl, pentadecyl, hexadecyl, heptadecyl, octadecyl, nonadecyl, and eicosanyl.

Examples of suitable cycloalkyl radicals R are cyclobutyl, cyclopentyl, cyclohexyl, bicyclo[2.2.1]heptyl, bicyclo[3.2.1] octyl, and tricyclodecyl.

Examples of suitable alkylcycloalkyl radicals R are methylenecyclohexane, ethylenecyclohexane, and propane-1,3-diylcyclohexane.

Examples of suitable cycloalkylalkyl radicals R are 2-, 3-, and 4-methyl-, -ethyl-, -propyl-, and -butylcyclohex-1-yl.

Examples of suitable aryl radicals R are phenyl, naphthyl, and biphenylyl.

Examples of suitable alkylaryl radicals R are benzyl-, ethylene-, and propane-1,3-diylbenzene.

Examples of suitable cycloalkylalkyl radicals R are 2-, 3-, and 4-phenylcyclohex-1-yl.

Examples of suitable arylalkyl radicals R are 2-, 3-, and 4-methyl-, -ethyl-, -propyl-, and -butylphen-1-yl.

Examples of suitable arylcycloalkyl radicals R are 2-, 3-, and 4-cyclohexylphen-1-yl.

Of these radicals R, hydrogen atoms and alkyl groups R, especially methyl groups, are of advantage and are therefore used with preference in accordance with the invention. Of particular advantage in terms of the grafting activity of the ethenyl group are methyl groups, and so they are used with very particular preference in accordance with the invention.

The above-described radicals A and R, unless they are hydrogen atoms, halogen atoms or nitrile groups, can be substituted. For this purpose it is possible to use electron-withdrawing or electron-donating atoms or organic radicals.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl, and arylcycloalkyl radicals, including those exemplified above, especially tert-butyl; aryloxy, alkyloxy, and cycloalkyloxy radicals, especially phenoxy, naphthoxy, methoxy, ethoxy, propoxy, butyloxy or cyclohexyloxy; arylthio, alkylthio, and cycloalkylthio radicals, especially phenylthio, naphthylthio, methylthio, ethylthio, propylthio, butylthio or cyclohexylthio; and tertiary amino groups, especially N,N-dimethylamino, N,N-diethylamino, N,N-dipropylamino, N,N-diphenylamino, N,N-dicyclohexylamino, N-cyclohexyl-N-methylamino or N-ethyl-N-methylamino. Suitable substituents are to be selected so that there can be no unwanted interaction, such as salt formation or crosslinking, for instance, with the hydrophilic groups present in the polyurethane (b) and in the graft copolymer (A/B). The skilled worker can therefore select suitable substituents with ease.

In accordance with the invention, unsubstituted radicals A and R are of advantage and are therefore used with particular preference.

The ethenylarylene groups are preferably attached to the main polyurethane chain of the polyurethane (b) via a divalent or trivalent linking radical containing at least one urethane and/or urea group.

The linking radicals preferably include at least one of the divalent or trivalent groups of the general formulae IIa to IIc:

  (IIa),

  (IIb) or

  (IIc), in which X denotes a divalent organic radical.

The variable X preferably stands for a divalent organic radical which derives from the following compounds:
(i) substituted and unsubstituted linear or branched alkanes, alkenes, cycloalkanes, cycloalkenes, alkylcycloalkanes, alkylcycloalkenes, alkenylcycloalkanes or alkenylcycloalkenes containing no heteroatoms or at least one heteroatom in the chain and/or in the ring;
(ii) substituted and unsubstituted aromatics or heteroaromatics; and
(iii) alkyl-, alkenyl-, cycloalkyl-, cycloalkenyl-, alkylcycloalkyl-, alkylcycloalkenyl-, alkenylcycloalkyl- or alkenylcycloalkenyl-substituted aromatics or heteroaromatics whose substituents are substituted or unsubstituted and contain no heteroatoms or at least one heteroatom in their chain and/or their ring.

Examples of suitable heteroatoms are oxygen, nitrogen, boron, silicon, sulfur, and phosphorus atoms.

Examples of suitable substituents are the abovementioned substituents, whose selection is subject to the comments made above.

Examples of suitable aromatics are benzene and naphthalene.

Examples of suitable heteroaromatics are thiophene, pyridine, and triazine.

Examples of suitable alkanes are branched and unbranched alkanes having preferably 1 to 10, in particular 3 to 6, carbon atoms in the molecule, such as methane, ethane, propane, butane, isobutane, pentane, neopentane, hexane, heptane, octane, isooctane, nonane, and decane.

Examples of suitable alkenes are ethylene and propylene.

Examples of suitable cycloalkanes are cyclopentane and cyclohexane.

Examples of suitable cycloalkenes are cyclopentene and cyclohexene.

Examples of suitable alkylcycloalkanes are methylcyclopentane and methylcyclohexane.

Examples of suitable alkylcycloalkenes are methylcyclopentene and methylcyclohexene.

Examples of suitable alkenylcycloalkanes are allyl- and vinylcyclopentane and allyl- and vinylcyclohexane.

Examples of suitable alkenylcycloalkenes are vinylcyclopentane and vinylcyclohexane.

Examples of suitable alkyl, alkenyl, cycloalkyl, cycloalkenyl, alkylcycloalkyl, alkylcycloalkenyl, alkenylcycloalkyl, and alkenylcycloalkenyl substituents are methyl, ethyl, propyl, isopropyl, n-butyl, sec-butyl, tert-butyl, vinyl, allyl, cyclohexyl, cyclohexenyl, 4-methylcyclohexyl, 4-methylcyclohexenyl, 3-allylcyclohexenyl, and 4-vinylcyclohexenyl.

The radicals X are preferably derived from organic compounds which themselves are unsubstituted or whose substituents are unsubstituted.

More preferably the radicals X are alkanediyl radicals having 3 to 6 carbon atoms in the molecule, especially the alkanediyl radical —(CH$_3$)$_2$—.

The olefinically unsaturated groups which are attached to the cycloaliphatic groups are preferably (meth)acrylate, ethacrylate, crotonate, cinnamate, vinyl ether, vinyl ester, vinyl, dicyclopentadienyl, norbornenyl, isoprenyl, isopropenyl, allyl and/or butenyl groups; dicyclopentadienyl ether, norbornenyl ether, isoprenyl ether, isopropenyl ether, allyl ether or butenyl ether groups; and/or dicyclopentadienyl ester, norbornenyl ester, isoprenyl ester, isopropenyl ester, allyl ester and/or butenyl ester groups, especially vinyl groups.

The cycloaliphatic groups are preferably derived from cycloaliphatics having 4 to 12 carbon atoms in the molecule and the cycloolefinic groups from cycloolefins having 4 to 12 carbon atoms in the molecule.

The cycloaliphatic groups are more preferably derived from cyclobutane, cyclopentane, cyclohexane, cycloheptane, cyclooctane, norbornane, bicyclo[2.2.2]octane, decalin, hydroindane, dicyclopentene, tricyclodecane or adamantane, and the cycloolefinic groups from cyclopentene, cyclohexene, cycloheptene, cyclooctene, norbornene, bicyclo[2.2.2]octene or cyclopentene.

The anhydrides of the alpha,beta-unsaturated carboxylic acids are preferably selected from the group consisting of acrylic, methacrylic, ethacrylic, and cinnamic anhydride. Methacrylic anhydride is used in particular.

Of the olefinically unsaturated groups described above the ethenylarylene groups are used with particular preference.

The preparation of the hydrophilic polyurethanes (b 1) has no particular features as far as method is concerned, being described in detail in German patent applications
DE 199 48 004 A 1, page 4 line 19 to page 10 line 24 and page 19 line 42 to page 20 line 7;
DE 199 53 445 A 1, page 4 line 34 to page 11 line 56 and page 18 line 52 to page 19 line 34;
DE 100 39 262 A 1, page 4 paragraph [0027] to page 9 paragraph [0101] and pages 17 and 18 paragraph [0193]; and
DE 199 53 446 A 1, column 3 line 20 to column 11 line 38 and column 18 line 48 to column 19 line 23.

To prepare the graft copolymers (A/B) at least one olefinically unsaturated monomer (a) is subjected to free-radical copolymerization in the presence of at least one of the above-described hydrophilic polyurethanes (b 1). The free-radical (co)polymerization of the olefinically unsaturated monomers (a) in the presence of a hydrophilic polyurethane (b 1)has no particular features as far as its method is concerned. Accordingly the suitable monomers (a) and the processes of free-radical (co)polymerization are likewise described in detail in German patent applications
DE 199 48 004 A 1, page 10 lines 27 to 41, page 10 line 48 to page 13 line 48, and page 20 lines 9 to 21;
DE 199 53 445 A 1, page 12 lines 6 to 10, page 12 line 21 to page 14 line 29, and page 19 lines 36 to 49;

DE 100 39 262 A 1, page 9 paragraph [0107] and [0108], page 9 paragraph [0110] to page 12 paragraph [0129], and page 18 paragraph [0194]; and DE 199 53 446 A 1, column 11 line 50 to column 16 line 46 and column 19 line 25 to column 20 line 32.

Besides at least one of the above-described graft copolymers (A/B) the aqueous basecoat material includes at least one other of the constituents described in detail in German patent applications DE 199 48 004 A 1, page 13 line 67 to page 17 line 8 and page 20 line 51 to page 22 line 11;

DE 199 53 445 A 1, page 14 line 48 to page 16 line 17 and page 20 line 12 to page 21 line 62;

DE 100 39 262 A 1, page 12 paragraph [0134] to page 14 paragraph [0135] and pages 18 paragraph [0198] to page 20 paragraph [0208]; and DE 199 53 446 A 1, column 17 line 15 to column 18 line 19, in the amounts specified therein.

The preparation of the aqueous basecoat material 2 has no special features but instead takes place conventionally by mixing of the above-described constituents in suitable mixing equipment such as stirred tanks, dissolvers or extruders.

In the course of step (III) of the process of the invention at least one, especially one, aqueous basecoat material 3 is applied to the outer surface of the dried aqueous basecoat film(s) 2, after which the resultant aqueous basecoat film(s) 3can be dried without being cured completely. For application and drying it is preferred to employ the methods described above.

As aqueous basecoat materials 3 it is possible to use any known aqueous basecoat materials, including the above-described aqueous basecoat materials 2. Examples of suitable, known aqueous basecoat materials 3, excluding aqueous basecoat materials 2, are described in the documents EP 0 089 497 A 1, EP 0 256 540 A 1, EP 0 260 447 A 1, EP 0 297 576 A 1, WO 96/12747, EP 0 523 610 A 1, EP 0 228 003 A 1, EP 0 397 806 A 1, EP 0 574 417 A 1, EP 0 531 510 A 1, EP 0 581 211 A 1, EP 0 708 788 A 1, EP 0 593 454 A 1, DE 43 28 092 A 1, EP 0 299 148 A 1, EP 0 394 737 A 1, EP 0 590 484 A 1, EP 0 234 362 A 1, EP 0 234 361 A 1, EP 0 543 817 A 1, WO 95/14721, EP 0 521 928 A 1, EP 0 522 420 A 1, EP 0 522 419 A 1, EP 0 649 865 A 1, EP 0 536 712 A 1, EP 0 596 460 A 1, EP 0 596 461 A 1, EP 0 584 818 A 1, EP 0 669 356 A 1, EP 0 634 431 A 1, EP 0 678 536 A1, EP 0 354 261 A1, EP 0 424 705 A1, WO 97/49745, WO 10 97/49747, and EP 817 684 A 1.

In step (IV) of the process of the invention at least one, especially one, pseudoplastic powder clearcoat slurry 4 is applied to the outer surface of the dried aqueous basecoat film(s) 3, and then the resultant clearcoat film(s) 4 is (are) dried if desired. For application and drying it is preferred to employ the methods described above.

The pseudoplastic powder clearcoat slurry 4 is a second generation slurry.

The powder clearcoat slurry 4 is preparable by (α) a secondary dispersion process by emulsifying an organic solution comprising binder and crosslinker to give an emulsion of the oil-in-water type, removing the organic solvent or solvents, and replacing some or all of the subtracted solvent volume by water, to give the powder clearcoat slurry comprising spherical dimensionally stable particles; or by means of (β) a melt emulsification process in which at least one constituent, preferably all constituents, of the powder clearcoat slurry is/are emulsified in the liquid state, in particular in the melt state, in an aqueous medium to form an aqueous emulsion of liquid particles and the emulsion is cooled to form an aqueous suspension of dimensionally stable particles.

The powder clearcoat slurry 4 is preferably prepared by means of the secondary dispersion process.

The powder clearcoat slurry 4 is preferably free from organic solvents. For the purposes of the present invention this means that it has a residual organic solvent content of <1% by weight, preferably <0.5% by weight, and more preferably <0.2% by weight. It is especially advantageous if the residual content is below the gas chromatography detection limit.

The powder clearcoat slurry 4 is preferably also free from external emulsifiers in this same sense.

The dimensionally stable particles of the powder clearcoat slurry 4 preferably have an average size of from 0.8 to 20 µm and a maximum size of 30 µm.

The pseudoplasticity of the powder clearcoat slurry 4 is brought about in conventional manner by means of rheology control auxiliaries, in particular by means of conventional ionic thickeners and nonionic associative thickeners.

Particularly suitable powder clearcoat slurries 4 preparable by the secondary dispersion process are known from German patent applications DE 198 41 842 A 1, page 3 line 3 to page 5 line 61 and page 7 line 1 to page 8 line 4;

DE 100 01 442 A 1, column 3 paragraph [0014] to column 9 paragraph [0071] and column 11 paragraph [0080] to column 12 paragraph [0090];

DE 100 55 464 A 1, page 2 paragraph [0008] to page 7 paragraph [0072] and page 10 paragraph [0100] to [0103] in conjunction with paragraphs [0106] and [0107]; and DE 100 27 292 A 1, page 2 paragraph [0013] to page 12 paragraph [0099] in conjunction with page 12 paragraphs [0100] and [0101] and page 12 paragraph [0103];

and from German patent

DE 100 27 290 C 2, page 2 paragraph [0012] to page 11 paragraph [0074] in conjunction with page 11 paragraphs [0075] and [0076] and paragraph [0078].

Particularly suitable powder clearcoat slurries 4 preparable by the melt emulsification process are known from German patent applications and patents DE 100 27 292 A 1, page 2 paragraph [0013] to page 12 paragraph [0099] in conjunction with page 12 paragraphs [0100] and [0101] and page 12 paragraph [0104];

DE 100 27 290 C 2, page 2 paragraph [0012] to page 11 [0074] in conjunction with page 11 paragraphs [0075] and [0076] and paragraph [0079];

DE 100 06 673 C 1, column 3 line 10 to column 7 line 19, column 7 line 49 to column 9 line 54, and column 14 line 24 to column 15 line 23; and DE 101 26 651 A 1, page 3 paragraph [0015] to page 14 paragraph [0130], page 16 paragraph [0155] to page 17 paragraph [0173], and page 18 paragraph [0194] to page 19 paragraph [0204].

Step (V) of the process of the invention comprises the joint curing of the dried clearcoat film(s) 4, of the aqueous basecoat film(s) 3 dried if desired, and of the aqueous basecoat film(s) 2 dried if desired, and also, where appropriate, of the primer film(s) 1 dried if desired, to give the multicoat paint system comprising at least one, especially one, primer coat 1, at least one, especially one, aqueous basecoat or functional coat or surfacer coat 2, at least one, especially one, aqueous basecoat 3, and at least one, especially one, clearcoat 4.

Curing takes place thermally. It is preferred to employ the methods described above. The thermal cure may also be supplemented by exposure to actinic radiation, a combination also referred to as dual cure. By actinic radiation is means electromagnetic radiation, such as near infrared (NIR), visible light, UV radiation, X-rays, and gamma radiation, especially UV radiation, and corpuscular radiation, such as electron beams, beta radiation, proton beams, neutron beams, and alpha radiation, especially electron beams.

In addition the clearcoats 4 may also have been coated with at least one further clearcoat, an organically modified ceramic coat for example, by means of which it is possible to achieve a significant improvement in the scratch resistance of the resultant multicoat paint system.

Within the multicoat paint system the thicknesses of the respective coats are as follows: primer coat 1 from 10 to 100 µm, more preferably from 10 to 80 µm, with particular preference from 10 to 50 µm, and in particular from 10 to 30 µm; aqueous basecoats 2 and 3 from 5 to 40 µm, more preferably from 5 to 30 µm, with particular preference from 5 to 25 µm, and in particular from 10 to 20 µm; and clearcoat 4 from 10 to 100 µm, more preferably from 15 to 80 µm, with particular preference from 20 to 70 µm and in particular from 25 to 60 µm.

The multicoat paint systems exhibit an outstanding profile of properties which is very well balanced in terms of mechanical properties, optical properties, corrosion resistance, and adhesion. Accordingly the multicoat paint systems have the high optical quality and intercoat adhesion the market requires and do not give rise to any problems such as deficient condensation resistance of the surfacer coats, cracking (mudcracking) in the basecoats, or leveling defects or surface textures in the clearcoats. Overall they possess the automotive quality the market requires.

In particular the multicoat paint systems have an outstanding metallic effect, an outstanding D.O.I. (distinctness of the reflected image), and an outstanding surface smoothness. They are stable to weathering, resistant to chemicals and bird droppings, scratch resistant, and exhibit very good reflow.

In particular, the intercoat adhesion between aqueous basecoat 3 and clearcoat 4 is so greatly improved as compared with the state of the art that even following exposure to stone chipping and/or condensation there is no longer any clearcoat delamination on subsequent exposure of the multicoat paint system to steam jets and/or hot water jets, such as takes place, for example, during the cleaning of automobiles.

Accordingly the substrates coated by means of the process of the invention also have particular advantages, such as a longer service life, a better esthetic impression to the viewer, and a greater technological usefulness, so making them particularly attractive from an economic standpoint specifically in the OEM finishing of automobiles.

EXAMPLES

Preparation Example 1

The Preparation of a Starting Product for Introducing Ethenylarylene Groups into a Polyurethane (b 1)

A reaction vessel equipped with stirrer, internal thermometer, reflux condenser and electrical heating was charged with 1050 parts by weight of methyl ethyl ketone, 450 parts by weight of N-methylpyrrolidone and 496.2 parts by weight of monoethanolamine at 20° C. Added dropwise to this mixture over the course of one and a half hours were 1030.8 parts by weight of 1-(1-isocyanato-1-methylethyl)-3-(1-methylethenyl)benzene (TMI® from CYTEC) at a rate such that the reaction temperature did not exceed 40° C. The resultant reaction mixture was stirred until free isocyanate groups were no longer detectable. Thereafter it was stabilized with 200 ppm of hydroquinone. The solids content of the reaction mixture was 50% by weight.

Preparation Example 2

The Preparation of a Polyurethane (b 1)

In a reaction vessel equipped with stirrer, internal thermometer, reflux condenser and electrical heating 1061 parts by weight of a linear polyesterpolyol (prepared from dimerized fatty acid (Pripol®1013), isophthalic acid and hexane-1,6-diol) having a hydroxyl number of 80 and a number-average molecular weight of 1400 daltons and 171.3 parts by weight of dimethylolpropionic acid and 53.5 parts by weight of trimethylolpropane were dissolved in 850.9 parts by weight of methyl ethyl ketone and 175 parts by weight of N-methylpyrrolidone. Added to the resulting solution at 45° C. were 709.4 parts by weight of isophorone diisocyanate. After the exothermic reaction had subsided the reaction mixture was heated slowly to 80° C. with stirring. It was stirred further at this temperature until the isocyanate content was substantially constant. Thereafter the reaction mixture was cooled to 65° C. and 209.3 parts by weight of the starting product from preparation example 1 were added. The resultant reaction mixture was stirred at 65° C. until the isocyanate content was 1.25% by weight and was constant. The reaction mixture was cooled to 60° C. and 69 parts by weight of diethanolamine were added. After the exothermic reaction had subsided stirring was continued at 60° C. until free isocyanate groups were no longer detectable. The resultant dissolved polyurethane (b 1) was admixed with 253 parts by weight of methoxypropanol and 97.9 parts by weight of triethylamine. 30 minutes after the addition of the amine, 3715 parts by weight of deionized water were added with stirring. The methyl ethyl ketone was distilled off from the resultant dispersion in vacuo at 60° C. After that, any losses of solvent and of water were compensated. The dispersion thus obtained of the inventive polyurethane (b 1) had a solids content of 35.0% by weight (1 h at 130° C.) and a pH of 7.1.

Preparation Example 3

The Preparation of the Primary Dispersion of the Graft Copolymer (A/B)

1392.9 parts by weight of the polyurethane dispersion (b 1) from preparation example 2 were diluted with 996.6 parts by weight of deionized water and heated to 85° C. Added at this temperature to the dispersion at a uniform rate over the course of 3.5 h and with stirring was a mixture of 139.4 parts by weight of styrene, 195.0 parts by weight of methyl methacrylate, 50.2 parts by weight of hydroxybutyl methacrylate, 43.9 parts by weight of n-butyl acrylate and 50.2 parts by weight of hydroxyethyl methacrylate. Commencement of the addition of the monomer mixture was accompanied by the addition over the course of 3.75 h of a solution of 7.3 parts by weight of tert-butyl peroxyethylhexanoate in 115.3 parts by weight of methoxypropanol. The resultant reaction mixture was stirred further at 85° C. until all of the monomers had reacted. Thereafter the dispersion was cooled to 40° C. and filtered through a 30 µm fabric sieve and a 1 µm plate filter. The resulting primary dispersion of the graft copolymer possessed very good storage stability. Its solids content was 32.0% by weight (1 h at 130° C.) and its pH was 7.1.

Examples 1 and 2 (Inventive) and C 1 and C 2 (Comparative)

The preparation of aqueous basecoat materials 2.1 and 2.2 (examples 1 and 2) and of aqueous basecoat materials C 1 and C 2 (examples C 1 and C 2)

Example C 1, Aqueous Basecoat Material C 1

(i) In accordance with the parts by weight indicated in table 1 the aqueous polyurethane dispersion described in EP 0 788 523 B2 in section 1.1 was admixed with a commercially customary leveling agent based on a water-dilutable acrylate resin, with a solution of a commercially customary antifoam based on an unsaturated branched diol, in solution in butylglycol, with Aerosil® R972 and R805, with talc, with a commercially customary lamp black, with Sicomix black, with titanium dioxide, with a filler based on an aluminum silicate, and with deionized water, and formed to a paste. This mixture was introduced into a batched laboratory sand mill and dispersed until it reached a fineness of max. 10 μm in the Hegmann grindometer.

(ii) This dispersion mixture was then used, with addition of further polyurethane resin dispersion, a mixed methanol-/butanol-etherified melamine resin 1 in butylglycol (Cymel® 1133 from Cytec Specialty Resins), a commercially customary sulfonic acid catalyst, a wetting additive based on silicone surfactants, a water-diluted commercially customary polyurethane thickener, and deionized water, to prepare the aqueous comparison paint I, which was adjusted with N,N-dimethylethanolamine to a pH of from 7.5 to 8.0 and with deionized water to a spray viscosity of 33 sec (DIN 4).

The weight fractions are evident from table 1.

Example C 2, Aqueous Basecoat Materials C 2

Example C 1 was repeated by using additionally a methanol-etherified melamine 2 (Cymel® 303 from Cytec Specialty Resins). The weight fractions are evident from table 1.

Example C 1, Aqueous Basecoat Material 2.1

Example C 1 was repeated but, when it came to completing the dispersion mixture in accordance with stage (ii), the graft copolymer (A/B) from preparation example 3 was used instead of the polyurethane dispersion of EP 0 788 523 B2. The weight fractions are evident from table 1.

Example 2, Aqueous Basecoat Material 2.2

Example 1 was repeated except that, when it came to pasting up the dispersion mixture from stage (i), the polyurethane dispersion used as grinding medium was that of European patent EP 0 521-928 B 1, "1.1 Binder dispersion A", page 9 lines 9 to 28 rather than that of EP 0 788 523 B2. The weight fractions are evident from table 1.

TABLE 1

Composition of the aqueous basecoat materials C 1, C 2 and 2.1 and 2.2

| | PARTS BY WEIGHT | | | |
|---|---|---|---|---|
| | Example C 1 | Example C 2 | Example 1 | Example 2 |
| Stage (i) | | | | |
| Polyurethane dispersion of EP 0 788 523 B2 | 13.0 | 13.0 | 13.0 | — |
| Binder A of EP 0 521 928 B1 | — | — | — | 11.7 |
| Leveling agent | 0.4 | 0.4 | 0.4 | 0.4 |
| Antifoam | 1.3 | 1.3 | 1.3 | 1.3 |
| Aerosil ® R972 | 0.3 | 0.3 | 0.3 | 0.3 |
| Aerosil ® R805 | 0.8 | 0.8 | 0.8 | 0.8 |
| Talc | 3.0 | 3.0 | 3.0 | 3.0 |
| Deionized water | 1.3 | 1.3 | 1.3 | 1.3 |
| Lamp black | 0.7 | 0.7 | 0.7 | 0.7 |
| Sicomix ® black | 1.9 | 1.9 | 1.9 | 1.9 |
| Titanium dioxide | 0.6 | 0.6 | 0.6 | 0.6 |
| Filler | 4.6 | 4.6 | 4.6 | 4.6 |
| Deionized water | 6.2 | 6.2 | 6.2 | 6.2 |
| Total dispersion mixture: | 34.1 | 34.1 | 34.1 | 34.1 |
| Stage (ii) | | | | |
| Polyurethane dispersion (EP 0 788 523 B2) | 31.6 | 31.6 | — | — |
| Polyurethane dispersion (A/B) from preparation example 3 | — | — | 33.2 | 33.2 |
| Melamine resin 1 | 1.0 | 1.0 | 1.0 | 1.0 |
| Melamine resin 2 | — | 3.0 | 3.0 | 3.0 |
| Butylglycol | 2.2 | 2.2 | 2.2 | 2.2 |
| Sulfonic acid catalyst | 0.3 | 0.3 | 0.3 | 0.3 |
| Wetting additive from Byk | 0.4 | 0.4 | 0.4 | 0.4 |
| Polyurethane thickener solution (2.5% strength) | 7.7 | 7.7 | 7.7 | 7.7 |
| Deionized water | 10 | 10 | 10 | 10 |
| Total: | 53.2 | 56.2 | 57.8 | 57.8 |
| Grand total: | 87.3 | 90.3 | 91.8 | 89.7 |

Preparation Example 4

The preparation of an aqueous basecoat material 3

In a mixing vessel, 7.3 parts by weight of a 3% strength aqueous thickener solution based on a sodium magnesium phyllosilicate from Laporte were mixed with 20.6 parts by weight of deionized water and 20.0 parts by weight of a 3% strength aqueous solution of a polyacrylate thickener from Allied Colloids and the mixture was adjusted to a pH of approximately 7.5 using a neutralizing agent.

Added to this mixture with stirring were 3.9 parts by weight of the polyurethane-modified polyacrylate from example D of DE 44 37 535 A1, 16.4 parts by weight of the polyurethane dispersion from example 2 of DE 199 48 004 A1, 0.3 part by weight of a solution of a commercially customary antifoam based on an unsaturated branched diol in solution in butylglycol, and 15 parts by weight of a pigment paste mixture having a pigment content of 2.1% by weight lamp black, 13.0% by weight Heliogren green L8730, 10.7% by weight Palomar blue B4806, and an amount of 53% by weight of EP 0 521 928 B 1, "1.1 Binder dispersion A", page 9 lines 9 to 28.

Added to the mixture described above with vigorous stirring was a mixture consisting of 5.0 parts by weight of a filler paste having an Aerosil content of 10% by weight and containing 50% by weight of polyurethane-modified polyacrylate according to example D of DE 44 37 535 A1, 3.7 parts by weight of butylglycol and 4.6 parts by weight of a melamine resin etherified with methanol and with butanol.

In a separate mixing vessel a mixture was formed by stirring together 0.5 part by weight of a commercial aluminum bronze (Alu-Stapa Hydrolux from Eckart, aluminum content 65% by weight) and 0.7 part by weight of butylglycol. This mixture was then added in portions to the other mixture, with vigorous stirring.

In a separate mixing vessel 0.7 part by weight of a commercial pearl luster pigment (Iriodin® 91034 Sterling Silber WR from Merck) and 0.9 part by weight of butylglycol were mixed. This mixture was then added in portions to the one described above, with vigorous stirring.

The second aqueous paint thus prepared was adjusted with neutralizing agent to a pH of from 7.6 to 8.0 and with deionized water to a spray viscosity of 100 mPas at 1000 sec$^{-1}$.

Examples 3 and 4 (Inventive) and C 3 and C 4 (Comparative)

Production of multicoat paint systems by the inventive process (examples 3 and 4) and conventionally (examples C 3 and C 4)

For example 3 the aqueous basecoat material 2.1 from example 1 was used.

For example 4 the aqueous basecoat material 2.2 from example 2 was used.

For example C 3 the aqueous basecoat material C 1 from example C 1 was used.

For example C 4 the aqueous basecoat material C 2 from example C 2 was used.

General Production Procedures:

a) Coat Systems for the Adhesion Test and the Condensation Test

The aqueous basecoat materials 2.1, 2.2, C 1 and C 2 were applied by spraying using an electrostatic high-speed rotation unit (Behr Ecobell, 45000 rpm, discharge rate: 120 ml/min, voltage: 60 kV) in one application with a dry film thickness of 15 μm to phosphated steel panels coated with a commercially customary electrocoat. Application took place at an air temperature of 23° C. and a relative air humidity of 60%.

The sprayed panels were flashed off at 23° C. and a relative air humidity of 60% for 5 minutes. They were then dried at a panel temperature of 70° C. in a forced-air oven for 5 minutes, the forced air circulation having a moisture content of max. 5-8 g water/kg air.

Following this intermediate drying the panels coated with the aqueous basecoat materials 2.1, 2.2, C 1 and C 2 were coated with the aqueous basecoat material 3 from preparation example 4 in a dry film thickness of 14 μm, flashed off at 23 ° C. and a relative air humidity of 60% for 5 minutes, and then dried at a panel temperature of 70° C. in a forced-air oven for 5 minutes, the forced air circulation having a moisture content of max. 5-8 g water/kg air.

Finally the panels were overcoated with a powder clearcoat slurry 4 in accordance with example 2 of DE 198 41 842 A1 in a dry film thickness of 40 μm, flashed off at 23° C. and a relative air humidity of 60% for 5 minutes, dried initially in a forced air oven with a forced air circulation temperature of 50° C. for 5 minutes, the forced air circulation having a moisture content of max. 3-6 g water/kg air, and subsequently films 2, 3 and 4 were baked together for 30 minutes at a forced air circulation temperature of 155° C.

b) Coat Systems for the Popping Test

The aqueous basecoat materials 2.1, 2.2, C 1 and C 2 were applied by spraying using an electrostatic high-speed rotation unit (Behr Ecobell, 45000 rpm, discharge rate: 120 ml/min, voltage: 60 kV) in one application with a dry film thickness of 15 μm to phosphated steel panels coated with a commercially customary electrocoat. Application took place at an air temperature of 23° C. and a relative air humidity of 60%.

The sprayed panels were flashed off at 23° C. and a relative air humidity of 60% for 5 minutes. They were then dried at a panel temperature of 70° C. in a forced-air oven for 5 minutes, the forced air circulation having a moisture content of max. 5-8 g water/kg air.

Following this intermediate drying the four panels coated with the aqueous basecoat materials 2.1, 2.2, C 1 and C 2 were overcoated with the aqueous basecoat material 3 from preparation example 4 in the form of a wedge with a dry film thickness of from 6 μm to 40 μm, flashed off at 23° C. and a relative air humidity of 60% for 5 minutes, and then dried at a panel temperature of 70° C. in a forced-air oven for 5 minutes, the forced air circulation having a moisture content of max. 5-8 g water/kg air.

Finally the panels were overcoated with a powder clearcoat slurry 4 in accordance with example 2 of DE 198 41 842 A1 in a dry film thickness of 40 μm, flashed off at 23° C. and a relative air humidity of 60% for 5 minutes, dried initially in a forced air oven with a forced air circulation temperature of 50° C. for 5 minutes, the forced air circulation having a moisture content of max. 3-6 g water/kg air, and subsequently films 2, 3 and 4 were baked together for 30 minutes at a forced air circulation temperature of 155° C.

Tests:

a) Adhesion Test

The multicoat paint systems thus produced of examples 3 and 4 (inventive) and of examples C 3 and C 4 (comparative) were aged under standard conditions for 12 h and then subjected to a multiple impact test (VDA [German Automakers Association] DIN 55996). The panels were subsequently subjected to a jet of water for 60 s (high-pressure cleaner from Kärcher), the water pressure being 67 bar, the water temperature 60° C. and the distance of the slot nozzle from the panels 10 cm. The area on the panels exposed to the jet from the nozzle measured 75 mm×7 mm.

The results are rated visually on a scale from 5 to 0. The separation level of the damage is indicated in parentheses.

5 here denotes a very poor result, 1 a very good result (slight damage), and 0 no damage. The results are listed in table 2.

b) Condensation Test to DIN 50017

The test panels produced as specified above were subjected to the constant condensation conditions of DIN 50017. Subsequently the intercoat adhesion was determined by means of the cross-cut test to DIN EN ISO 2409 after 1 h and 24 h of regeneration. The results are listed in table 2.

c) Popping Test

The test panels produced as specified above have an aqueous basecoat 2.1, 2.2, C 1 and C 2 film thickness of 15 μm, an aqueous basecoat 3 film thickness of from 6 to 40 μm and a clearcoat 4 film thickness of 40 μm. The popping limit indicates the film thickness at which surface defects (pops) appeared in the clearcoats 4. The results are listed in table 2.

TABLE 2

| | Results | | | |
|---|---|---|---|---|
| | Example C 3 | Example C 4 | Example 3 | Example 4 |
| Adhesion test | 5 (=clearcoat delamination) | 5 (=clearcoat delamination) | 1 | 1 |
| Surface pops* | 35 µm | 35 µm | 45 µm | 43 µm |
| Edge pops* | 80 µm | 92 µm | 110 µm | 107 µm |
| Cross-cut test 1 h | GT5 | GT5 | GT0 | GT0 |
| Cross-cut test 24 h | GT0 | GT0 | GT0 | GT0 |

*Surface pops: Cumulative film thickness made up of the dry film thicknesses of the respective aqueous basecoats 2.1, 2.2, C 1 and C 2 and the aqueous basecoat 3; dry film thickness of the clearcoat 4 = 40 µm.
*Edge pops: Cumulative film thickness made up of the dry film thicknesses of the respective aqueous basecoats 2.1, 2.2, C 1 and C 2 and the aqueous basecoat 3 plus dry film thickness of the clearcoat 4 on the edge.

The different formulations of the aqueous basecoats 2 (2.1 and 2.2 on the one hand and C 1 and C 2 on the other) had a considerable influence both on the film thickness of the aqueous basecoats 3 that was achievable without defects and on the intercoat adhesion within the multicoat paint systems, particularly on the adhesion between the aqueous basecoats 3 and the clearcoats 4. The grinding medium had no effect in this case on the improvements which were achieved.

What is claimed is:

1. A process for improving the intercoat adhesion in a multicoat paint system produced by means of an integrated wet-on-wet process comprising
   (I) applying at least one primer material to the surface of a substrate, to form at least one primer film, and if desired drying the resulting primer film(s) 1, without fully curing it (them), or curing the primer film(s) 1 to give at least one primer coat 1,
   (II) applying at least one aqueous basecoat material 2 to the outer surface of the primer film(s) 1 or primer coat(s) 1 and if desired drying the resulting aqueous basecoat film(s) 2 without fully curing it (them),
   (III) applying at least one aqueous basecoat material 3 to the outer surface of the dried aqueous basecoat film(s) 2 and if desired drying the resulting aqueous basecoat film(s) 3 without fully curing it (them),
   (IV) applying at least one pseudoplastic powder clearcoat slurry 4 prepared by means of at least one of
      (α) a secondary dispersion process of emulsifying an organic solution comprising binder and crossliniker to give an emulsion of the oil-in-water type, removing the organic solvent or solvents, and replacing some or all of the subtracted solvent volume by water, to give the powder clearcoat slurry comprising spherical dimensionally stable particles, or
      (β) a melt emulsification process in which at least one constituent of the powder clearcoat slurry is emulsified in the melt state, in an aqueous medium to form an aqueous emulsion of liquid particles and the emulsion is cooled to form an aqueous suspension of dimensionally stable particles,
   to the outer surface of the dried aqueous basecoat film(s) 3 and optionally drying the resulting clearcoat film(s) 4, and
   (V) jointly curing the clearcoat film(s) 4, the aqueous basecoat film(s) 3, and the aqueous basecoat film(s) 2 and also where appropriate the primer film(s), if uncured, 1 to give the multicoat paint system comprising at least one primer coat 1, at least one aqueous basecoat 2, at least one aqueous basecoat 3, and at least one clearcoat 4;
   wherein the aqueous basecoat material(s) 2 employed in stage (II) comprise(s) as binder at least one dispersed graft copolymer (A/B) whose particles are composed of a hydrophobic core (A) of at least one copolymerized olefinically unsaturated monomer (a) and a hydrophilic shell (B) which comprises at least one polyurethane (b) and is prepared by subjecting the monomers (a) to free-radical (co)polymerization in the presence of at least one polyurethane (b) containing at least one olefinically unsaturated group selected from the group consisting of
   lateral and terminal ethenylarylene groups;
   lateral olefinically unsaturated groups attached to cycloaliphatic groups which constitute members of the main polymer chains;
   lateral cycloolefinically unsaturated groups which constitute members of the main polymer chains;
   terminal olefinically unsaturated groups attached to cycloaliphatic groups which constitute the end groups of the main polymer chains;
   terminal cycloolefinically unsaturated groups which constitute the end groups of the main polymer chains; and
   lateral and terminal olefinically unsaturated groups obtained by reacting polyurethanes with anhydrides of alpha,beta-unsaturated carboxylic acids and further wherein the aqueous basecoat material(s) 3 are different from the aqueous basecoat material(s) 2 and do not comprise the at least one dispersed graft copolymer (A/B) binder of the aqueous basecoat material(s) 2.

2. The process of claim 1, wherein the pseudoplastic powder clearcoat slurry 4 is prepared by a secondary dispersion process.

3. The process of claim 2, wherein the pseudoplastic powder clearcoat slurry 4 is free from organic solvents and external emulsifiers and the dimensionally stable spherical particles have an average size of from 0.8 to 20 µm and a maximum size of 30 µm.

4. The process of claim 1, wherein an ethenylarylene group of the general formula I is used:

$$CH_2=C(R)-A- \qquad (I),$$

in which the variable A stands for a substituted or unsubstituted $C_6$-$C_{20}$ arylene radical and the variable R stands for at least one of a hydrogen atom, a halogen atom, a nitrile group, an unsubstituted alkyl, substituted alkyl, cycloalkyl, alkylcycloalkyl, cycloalkylalkyl, aryl, alkylaryl, cycloalkylaryl, arylalkyl and arylcycloalkyl radicals.

5. The process of claim 4, wherein the radical R stands for a hydrogen atom or a methyl group, in particular a methyl group.

6. The process of claim 1, wherein the arylene radical is 1,2-, 1,3- and/or 1,4-phenylene, in particular 1,3-phenylene.

7. The process of claim 1, wherein the ethenylarylene group is connected to the main chain of the polyurethane (b) by way of a divalent or trivalent linking radical containing at least one urethane and/or urea group.

8. The process of claim 7, wherein the linking radical contains at least one of the divalent or trivalent groups of the general formulae IIa to IIc $$—X—NH—C(O)—O— \qquad (IIa),$$

$$—X—NH—C(O)—NH— \qquad (IIb) \text{ or}$$

$$—X—NH—C(O)—N< \qquad (IIc),$$

in which X is a divalent organic radical.

9. The process of claim 1, wherein the olefinically unsaturated groups attached to the cycloaliphatic groups are selected from the group consisting of (meth)acrylate, ethacrylate, crotonate, cinnamate, vinyl ether, vinyl ester, vinyl, dicyclopentadienyl, norbornenyl, isoprenyl, isopropenyl, allyl and butenyl groups and mixtures thereof dicyclopentadienyl ether, norbornenyl ether, isoprenyl ether, isopropenyl ether, allyl ether and butenyl ether groups and mixtures thereof and dicyclopentadienyl ester, norbornenyl ester, isoprenyl ester, isopropenyl ester, allyl ester and butenyl ester groups and mixtures thereof.

10. The process of claim 9, wherein the olefinically unsaturated groups are vinyl groups.

11. The process of claim 1, wherein the cycloaliphatic groups are derived from cycloaliphatics having from 4 to 12 carbon atoms in the molecule and the cycloolefinic groups are derived from cycloolefins having from 4 to 12 carbon atoms in the molecule.

12. The process of claim 11, wherein the cycloaliphatic groups are derived from acompounds selected from the group consisting of cyclobutane, cyclopentane, cyclohexane, cycloheptane, cyclooctane, norbornane, bicyclo[2.2.2]octane, decalin, hydroindane, dicyclopentene, tricyclodecane and adamantane, and the cycloolefinic groups from cyclopentene, cyclohexene, cycloheptene, cyclooctene, norbornene, bicyclo[2.2.2]octene and dicyclopentene.

13. The process of claim 1, wherein the anhydrides of alpha, beta-unsaturated carboxylic acids are selected from the group consisting of acrylic, methacrylic, ethacrylic, and cinnamic anhydride.

14. The process of claim 13, wherein methacrylic anhydride is used.

* * * * *

UNITED STATES PATENT AND TRADEMARK OFFICE
CERTIFICATE OF CORRECTION

PATENT NO. : 7,579,048 B2
APPLICATION NO. : 10/549055
DATED : August 25, 2009
INVENTOR(S) : Wegner et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 936 days.

Signed and Sealed this

Fourteenth Day of September, 2010

David J. Kappos
*Director of the United States Patent and Trademark Office*